United States Patent [19]
McNulty, Jr.

[11] Patent Number: 6,053,088
[45] Date of Patent: Apr. 25, 2000

[54] APPARATUS FOR USE WITH NON-LETHAL, ELECTRICAL DISCHARGE WEAPONS

[76] Inventor: James F. McNulty, Jr., 1290 3rd St., Calimesa, Calif. 92320

[21] Appl. No.: 09/110,292

[22] Filed: Jul. 6, 1998

[51] Int. Cl.⁷ ....................................................... A22B 3/06
[52] U.S. Cl. .............................. 89/1.11; 42/1.08; 361/232
[58] Field of Search .............................. 89/1.11; 361/232; 231/7; 42/1.08, 84; 102/502

[56] References Cited

U.S. PATENT DOCUMENTS

| | | | |
|---|---|---|---|
| 3,119,554 | 1/1964 | Fagan et al. ................................. | 231/7 |
| 3,227,362 | 1/1966 | Laten .......................................... | 231/7 |
| 3,998,459 | 12/1976 | Henderson et al. .................... | 463/47.3 |
| 4,253,132 | 2/1981 | Cover ....................................... | 361/232 |
| 4,424,932 | 1/1984 | Allen .......................................... | 231/7 |
| 4,667,431 | 5/1987 | Mendicino .................................... | 43/6 |
| 4,719,534 | 1/1988 | Ward ....................................... | 361/232 |
| 5,392,029 | 2/1995 | Chang ..................................... | 340/574 |
| 5,654,867 | 8/1997 | Murray .................................... | 361/232 |
| 5,831,199 | 11/1998 | McNulty, Jr. et al. ................... | 89/1.11 |
| 5,936,183 | 8/1999 | McNulty, Sr. ............................ | 89/1.11 |

Primary Examiner—Charles T. Jordan
Assistant Examiner—Jeffrey Howell
Attorney, Agent, or Firm—Leonard Tachner

[57] ABSTRACT

An addition device which permits a user of a close proximity electrical discharge weapon to modify his or her weapon by providing an improved short range capability as well as a long range capability which can be added as an after-market improvement. The invention is an apparatus designed to be mechanically and electrically attached to the device and provides a wire-tethered dart cartridge which extends above the weapon and gives the user the additional capability of contacting long range targets. The apparatus permits easy and convenient replacement of spent cartridges as well as easy and convenient connection to the close proximity device. The apparatus also improves short range performance by widening the separation of contact electrodes and by increasing the penetration voltage to increase effectiveness.

7 Claims, 4 Drawing Sheets

US 6,053,088

APPARATUS FOR USE WITH NON-LETHAL, ELECTRICAL DISCHARGE WEAPONS

BACKGROUND OF THE INVENTION

1. Field of the Invention

The present invention relates generally to the field of non-lethal, electrical discharge weapons such as TASER® devices and more specifically to a device which is designed to be added as an accessory to such weapons of a close proximity type to provide a long range capability and improve short range effectiveness.

2. Prior Art

Electrical discharge weapons have become fairly commonplace in recent years. Numerous U.S. patents have issued for invention of such weapons and for their further improvement. U.S. Pat. No. 3,523,538 issued to Shimzu on Aug. 11, 1970; U.S. Pat. No. 3,803,463 issued to Cover on Apr. 9, 1974; U.S. Pat. No. 4,253,132 issued to Cover on Feb. 24, 1981; U.S. Pat. No. 5,473,501 issued to Claypool on Dec. 5, 1995; U.S. Pat. No. 5,654,867 issued to Murray on Aug. 5, 1997; and U.S. Pat. No. 5,698,815 issued to Ragner on Dec. 16, 1997. They provide an effective but non-lethal form of self-defense which may be legally carried on one's person for safety. They have also been used extensively in law enforcement. Generally, there are two types of such weapons, namely, those designed for use in close proximity to another and those having a relatively long range, i.e., 10 feet or more. The close proximity weapons typically have two separated electrodes affixed to the weapon. The weapon must be moved toward a perpetrator so that the electrodes contact the target at two spaced-apart locations. Trained operators can apply the weapon electrodes with precision to the most responsive areas of the target anatomy. The long range weapon usually provides two launchable, wire-tethered conductive darts which are propelled at a fixed angle from each other by gun powder to a remote target some distance away. If the two darts contact the perpetrator, the discharge through the wire tethers and the darts will disable the target. Each of these types of weapons has its respective advantages. For example, the close proximity weapon is more effective in situations where a perpetrator is already in contact with the weapon's user such as in surprise attack scenarios or for potential robbery victims within reach of a threatening perpetrator. On the other hand, where time and distance permit, a long range weapon can be very effective before a perpetrator gets too close to the user. With close proximity perpetrators, a loss of distance between the long range weapon's opposed contacts at the target is observed to jeopardize weapon effectiveness. Precision application of the long range weapon's contacts to more responsive areas of the target anatomy to overcome any such loss of effectiveness is unlikely.

There are some weapons available which have both long range and close proximity capability. They have a dart cartridge and a pair of attached "feeler probes" with two switches permitting actuating one or the other. However, these weapons are only available if purchased with this dual function capability to start with. While there is at least one prior art device which permits a user, who already possesses a close proximity unit, to add a long range capability to that unit as an after-market addition. As with the other dual function weapons described above, it does nothing to improve the effectiveness of the close proximity function. Moreover, ammunition cannot be reloaded into the attachment.

SUMMARY OF THE INVENTION

The present invention is an addition device which permits a user of a close proximity electrical discharge weapon to modify his or her weapon by providing a long range capability which can be added as an after-market improvement. It also advantageously improves close proximity effectiveness by widening the electrode gap between contact probes and, in one embodiment, it increases penetration voltage. In a preferred embodiment illustrated and described herein, the original close proximity device is a hand-held plastic device having a pair of extending contact probes for disabling a nearby perpetrator. The invention is an apparatus designed to be mechanically and electrically attached to the device and provides a wire-tethered dart cartridge which extends above the weapon and gives the user the additional capability of contacting long range targets. The apparatus permits easy and convenient replacement of spent cartridges as well as easy and convenient connection to and disconnection from the close proximity device. Moreover, the brackets used to engage the dart cartridge may be readily spread apart to provide a more effective spread to increase the effectiveness of the applied voltage of the close proximity function.

OBJECTS OF THE INVENTION

It is therefore a principal object of the present invention to provide an apparatus for addition to a close proximity electrical discharge weapon to add a long range capability to the weapon.

It is another object of the invention to provide an after-market device which permits users of close proximity electrical discharge weapons to add a long range wire-tethered dart system to their weapons and to make the close proximity function more effective.

It is still another object of the invention to provide an improved combination of close proximity electrical discharge weapon and wire-tethered dart long range electrical discharge weapon.

It is still another object of the invention to provide a method for modifying a close proximity electrical discharge weapon to give the weapon a long range capability and to increase the spread of the contact probes in the close proximity mode of operation.

It is still another object of the invention to increase the spread between the contacts of a close proximity electrical discharge weapon while separating the weapons breakdown electrodes and, thereby, increasing the weapon's target penetrating voltage.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
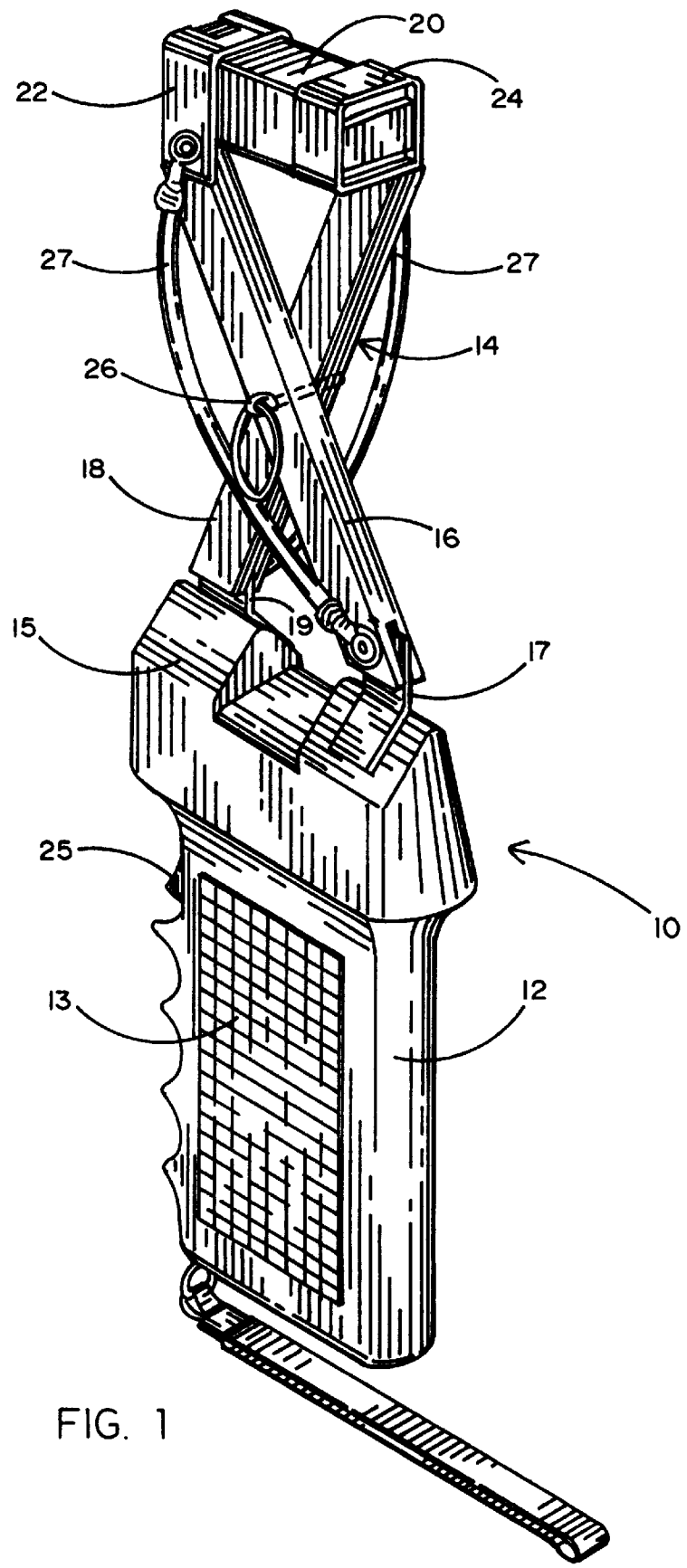
FIG. 1 is a three-dimensional view of an improved electrical discharge weapon in accordance with a preferred embodiment of the invention.

Referring to the accompanying drawings, it will be seen that an improved, non-lethal, electrical discharge weapon 10 comprises a conventional hand held close proximity device 12 to which, by virtue of the present invention, there has been added a dart launcher assembly 14. The device 12 has a handle portion 13 and a head portion 15, the latter having a pair of electrodes 21 and 23. The launcher assembly 14 is attached to the head portion 15 by a pair of connection members 17 and 19, which make contact with electrodes 21 and 23, respectively.

Figure 2:
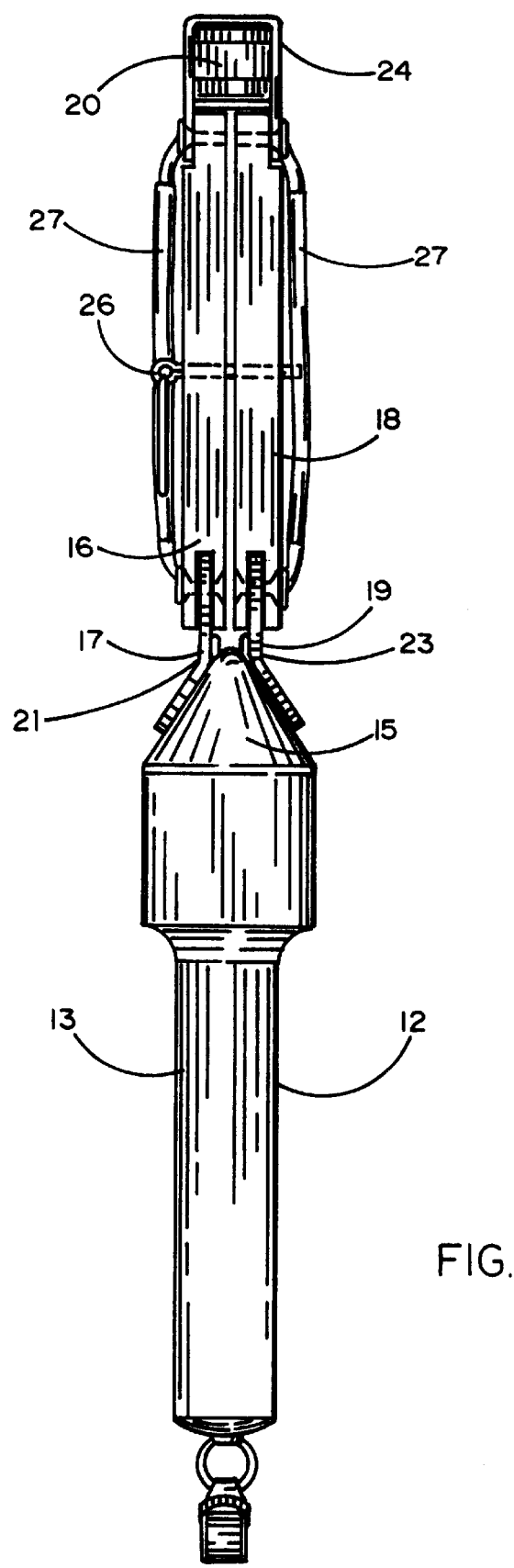
FIG. 2 is a side view thereof.

The launcher assembly comprises a pair of extender arms 16 and 18. The arms are attached to the connection members 17 and 19 for limited articulation relative thereto and have heavy gauge wires 27 running through them. Arms 16 and 18 extend upwardly (as seen in FIG. 1) from head portion 15 in a crossing diagonal fashion so that they overlap at their approximate mid-point. There at the overlap, the two arms are joined by a stabilizer 26. Arms 16 and 18 extend further to a first cartridge bracket 22 and a second cartridge bracket 24, respectively. Brackets 22 and 24 retain a wire-tethered dart cartridge 20 which is a conventional configuration well-known in the art of TASER® guns. In the fully assembled configuration shown in FIGS. 1 and 2, upon compression of a trigger 25 (seen in FIG. 1), a high voltage is applied through the pair of heavy gauge wires 27 running adjacent arms 16 and 18, respectively (see FIG. 1). The voltage is available at the brackets 22 and 24 and is thereby applied to cartridge 20. The cartridge contains smokeless gun powder adjacent each of two darts (not shown). The gun powder ignites and propels the wire-tethered darts toward a remote target. The darts impale the exterior surface of the target thereby applying the high voltage to the target.

Figure 3:
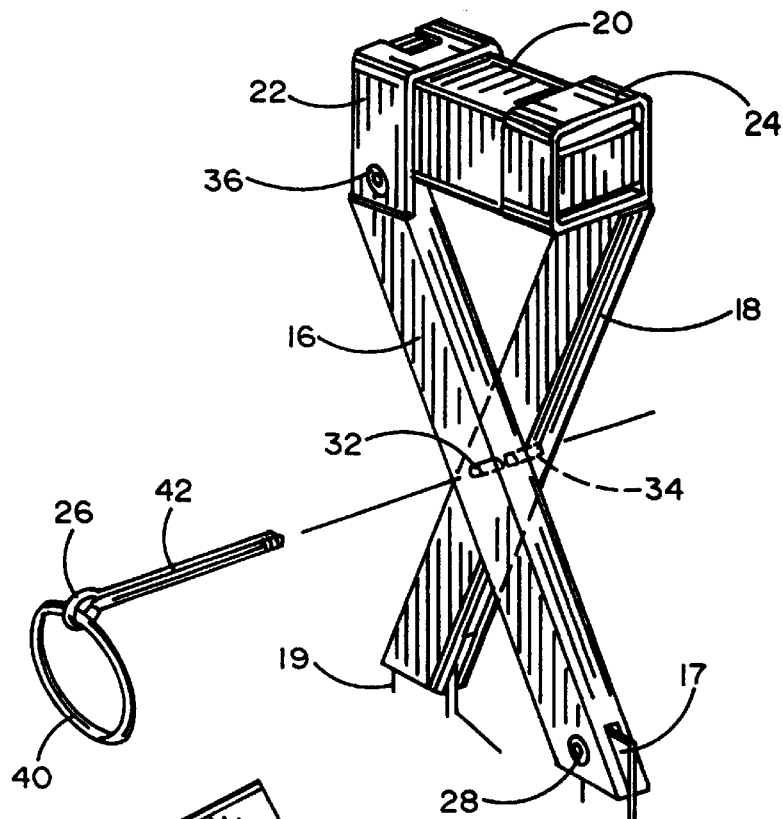
FIG. 3 is a partial three-dimensional view of the invention with a stabilizer pin removed therefrom.
Figure 4:
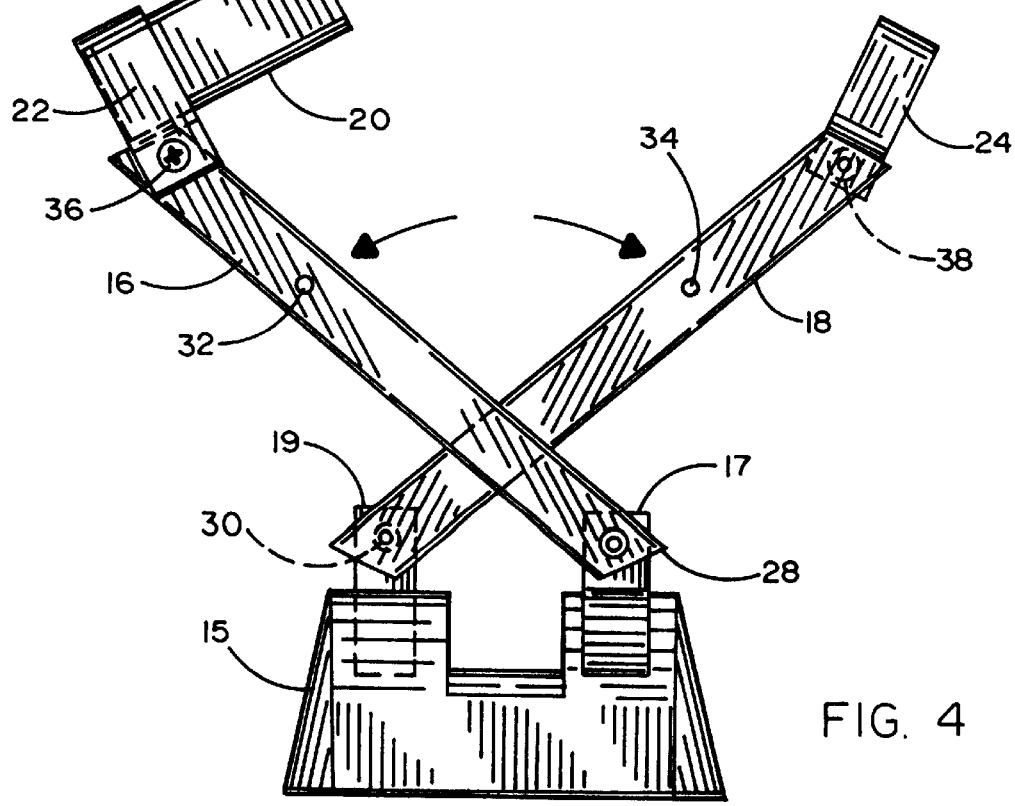
FIG. 4 is a partial elevational view showing separation of extender arms for removal and replacement of a dart cartridge.

The cartridge 20 may be readily removed from the assembly 14 and replaced with an unspent cartridge for subsequent firing. As shown in FIGS. 3 and 4, access to a cartridge 20 is obtained by pulling stabilizer 26 from apertures 32 and 34 in arms 16 and 18, respectively. A pull ring 40 attached to an elongated pin 42, facilitates removal of the stabilizer 26. Then arms 16 and 18 may be further articulated around fasteners 28 and 30, respectively. Brackets 22 and 24 are also articulated relative to fasteners 36 and 38, respectively. This action separates bracket 24 from the cartridge.

Figure 5:
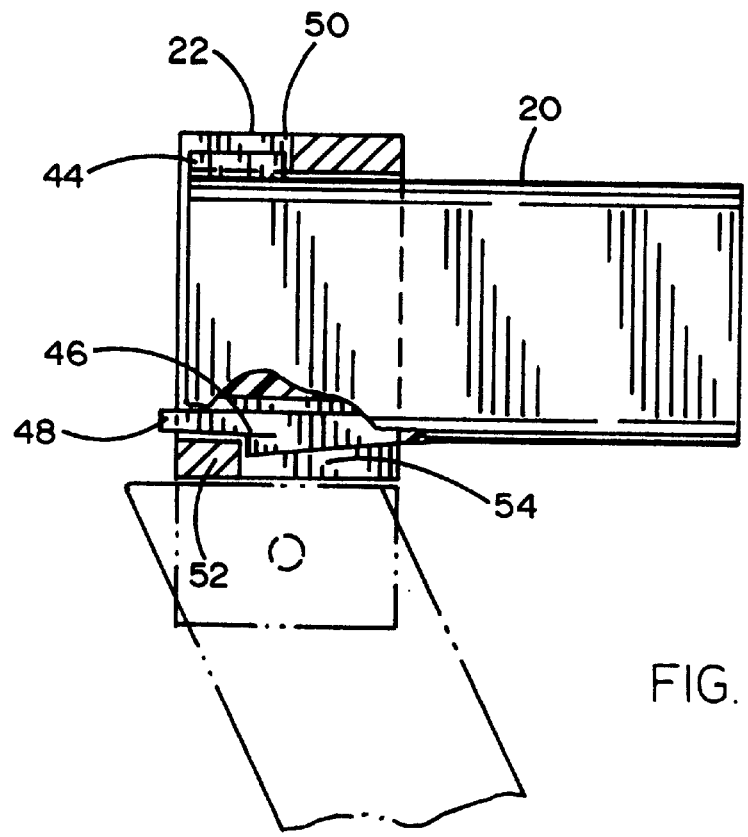
FIGS. 5 and 6 illustrate, in an enlarged view, how a cartridge is retained and removed, respectively, in the invention.
Figure 6:
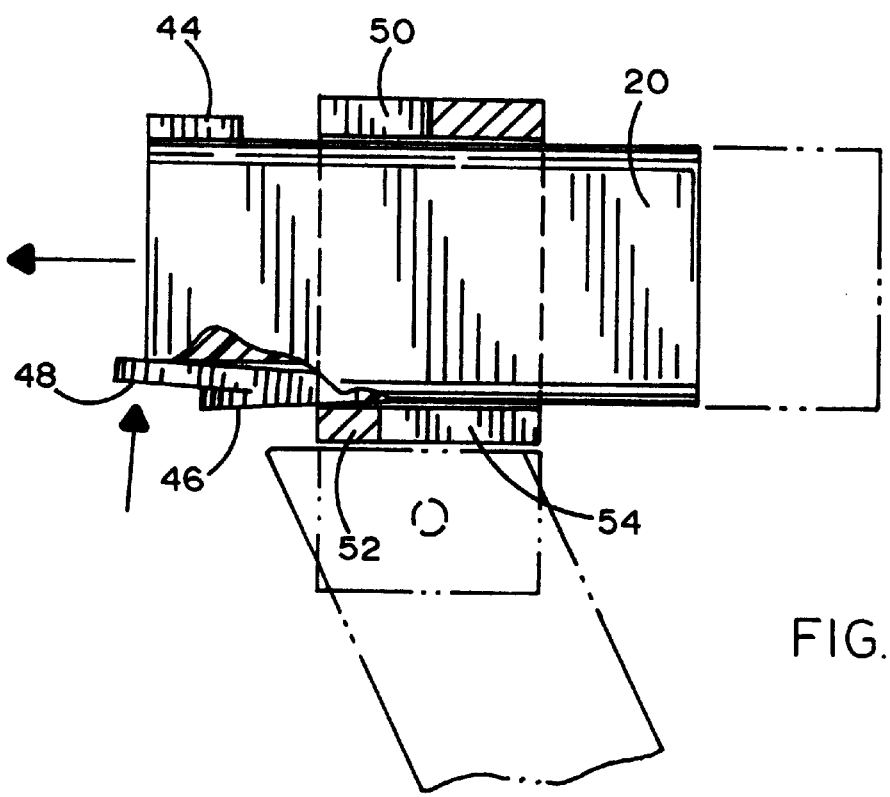

Removal of cartridge 20 from bracket 22 is illustrated in FIGS. 5 and 6. The cartridge is retained in bracket 22 by means of a stop 44 and a shoulder 46 which reside in bracket notches 50 and 52, respectively. The cartridge 20 has a lever arm 48 which extends beyond bracket 22 and acts as a spring-like mechanism for raising shoulder 46 so that it may be released from notch 52 to permit removal of the cartridge as illustrated in FIG. 6. Installation of a new cartridge involves a reversal of the foregoing until the is fully assembled configuration of FIGS. 1 and 2 is again achieved.

The spread-apart arms 16 and 18 also provide improved close proximity performance. With cartridge 20 removed, brackets 22 and 24 become contact probes in the close proximity mode of use. The much wider spread of the brackets 22 and 24 as compared to the electrodes 21 and 23, results in much more likely disablement of a perpetrator as the high voltage is applied across a greater extent of the perpetrator's body. Moreover, the arms prevent the perpetrator's body flesh from entering the region between electrodes 21 and 23 and coming in contact with a pair of optional breakdown electrodes (not shown) which reduce the voltage level applied to the perpetrator. Thus, the invention assures that maximum available voltage is applied to a perpetrator. Furthermore, the closer proximity of brackets 22 or an atmospherically exposed electrode in electrical contact therewith (not shown) and 24 or an atmospherically exposed electrode in electrical contact therewith (not shown) in the closed arm position of FIG. 1, provides the breakdown electrode function to safeguard the transformer and associated electronics within the device 12.

Thus it will be observed that by means of the inventive improvement herein disclosed, a conventional close proximity electrical discharge weapon may be readily modified to provide a long range, remote target disabling capability as well as a more effective close proximity function. Those having skill in the relevant arts will now perceive various additions and modifications which may be made to the invention. By way of example, other ways for attachment of the launching assembly to the weapon and for attachment of the cartridge to the assembly, will be readily apparent. By way of further example, the arms may be spring-loaded to automatically spread them apart upon removal of the stabilizer pin. Thus it is to be understood that the disclosed embodiment while presently being contemplated as the best mode of the invention is nevertheless only an exemplary illustration and not necessarily limiting of the scope hereof.

What is claimed is:

1. An apparatus for mechanical and electrical attachment to a hand-held, close proximity electrical discharge weapon; the weapon having a head portion with at least two electrodes extending therefrom for disabling a nearby perpetrator; the apparatus configured for retaining a wire-tethered dart-carrying cartridge for disabling a remote perpetrator at a long rage; the apparatus comprising:

a pair of arms affixed to said head portion and extending therefrom; said arms carrying electrical conductors connected to said electrodes;

a pair of cartridge brackets for receiving opposite ends of said cartridge for mechanically retaining said cartridge while making electrical contact therewith and with said conductors for launching a dart toward said remote perpetrator upon activation of said weapon;

wherein said arms are each articulatable for separating said cartridge brackets from said cartridge for removal and replacement of spent cartridges and increased electrode spread in close proximity operation.

2. The apparatus recited in claim 1 wherein said cartridge brackets comprise means for mechanically locking said cartridge in place.

3. The apparatus recited in claim 1 wherein said arms are affixed to said head portion by fasteners, said fasteners being in electrical contact with said electrodes.

4. An apparatus for mechanical and electrical attachment to a hand-held, close proximity electrical discharge weapon; the weapon having a head portion with at least two electrodes extending therefrom for disabling a nearby perpetrator; the apparatus configured for retaining a wire-tethered dart-carrying cartridge for disabling a remote perpetrator at a long rage; the apparatus comprising:

a pair of arms affixed to said head portion and extending therefrom; said arms carrying electrical conductors connected to said electrodes;

a pair of cartridge brackets for receiving opposite ends of said cartridge for mechanically retaining said cartridge while making electrical contact therewith and with said conductors for launching a dart toward said remote perpetrator upon activation of said weapon;

wherein said arms are positioned at an acute angle crossing each other at an overlap location, said apparatus further comprising a stabilizing pin extending through said arms at said overlap location for selectively fixing said arms at said acute angle.

5. A method for modifying a close proximity electrical discharge weapon for providing a long range capability for the weapon, the weapon having a pair of contact electrodes; the method comprising the following steps:

a) connecting an extension to said weapon, said extension having electrical connection to said electrodes;

b) providing said extension with at least one bracket for holding a cartridge having wire-tethered darts;

c) affixing said at least one bracket both electrically and mechanically to said extension for activating a cartridge in response to activation of said weapon.

6. The method recited in claim 5 further comprising the step of making said at least one bracket removable from a cartridge to permit replacement of spent cartridges.

7. An apparatus for mechanical and electrical attachment to a hand-held, close proximity electrical discharge weapon; the weapon having a head portion with at least two electrodes extending therefrom for disabling a nearby perpetrator; the apparatus configured for retaining a wire-tethered dart-carrying cartridge for disabling a remote perpetrator at a long rage; the apparatus comprising:

a pair of arms affixed to said head portion and extending therefrom; said arms carrying electrical conductors connected to said electrodes;

a pair of cartridge brackets for receiving opposite ends of said cartridge for mechanically retaining said cartridge while making electrical contact therewith and with said conductors for launching a dart toward said remote perpetrator upon activation of said weapon;

wherein said arms are each articulatable for increasing electrode spread and breakdown voltage thereby increasing target penetrating voltage.

* * * * *